3,767,655
INTERMEDIATES FOR THE PRODUCTION OF
CEPHALOSPORIN COMPOUNDS
Lee C. Cheney and William J. Gottstein, Fayetteville,
N.Y., assignors to Bristol-Myers Company, New York,
N.Y.
No Drawing. Filed Sept. 30, 1971, Ser. No. 185,384
Int. Cl. C07d 99/24
U.S. Cl. 260—243 C    11 Claims

ABSTRACT OF THE DISCLOSURE

Cephalosporins having a 7-α-aminoarylacetamido substituent and a nucleophile on the 3-methyl group are prepared by reaction of the nucleophile with the new intermediates, 7 - (D - 2,2 - dimethyl - 3 - nitroso - 5 - oxo-4-aryl - 1 - imidazolidinyl - 3 - bromomethyl - 3 - cephem-4-carboxylic acid sulfoxides and their easily hydrolyzed esters such as trimethylsilyl and 2,2,2-trichloroethyl, followed by removal of the blocking groups, as by hydrogen chloride in dioxane or glacial acetic acid. The intermediates themselves are prepared by bromination, as with N-bromosuccinimide, of the corresponding 3-methyl compounds.

BACKGROUND OF THE INVENTION

Field of the invention

This invention includes new processes and new intermediates for the production of compounds of the cephalosporin class and particularly cephalosporins having a nucleophilic substituent on the methylene group at the 3-position.

Description of the prior art

Applicants' starting materials are the 3-methyl cephalosporins of the "cephalexin type" having a particular blocking group on the α-amino group as described in their, prior, copending applications Ser. No. 27,441, filed Apr. 10, 1970 and now abandoned, and Ser. No. 78,165 filed Oct. 5, 1970 and issued Jan. 30, 1973 as U.S. 3,714,146; for a brief summary of previously used blocking groups see page 10 of Great Britain 1,241,656.

U.S. Pat. 3,507,861 describes such 3-methyl cephalosporins, including the well-known cephalexin, which is also described, for example, in J. Med. Chem., 12, 310–313 (1969), in Great Britain 1,174,335, in South Africa 67/1260 (Farmdoc 28654), in Japan 16871/66 (Farmdoc 23231), in Belgium 696,026 (Farmdoc 29494).

The conversion of a penicillin sulfoxide ester (by heating in the presence of a strong acid) to the corresponding ester of a similarly N-acylated derivative of 7-ADCA has been reported in U.S. Pat. 3,275,626 and in J. Amer. Chem. Soc., 85, 1896 (1963) and 91(6), 1401–1407 (1969). Variations of this process are given in Netherlands 68/06532 (Farmdoc 34685) and Netherlands 68/06533 (Farmdoc 34686). In those patents the side-chain is usually that of a fermentable penicillin such as penicillin G or V (although see Column 7 of U.S. Pat. 3,275,626) and the product is an ester which must be cleaved, as by hydrogenation, to produce the active, free acid form of the final derivative of 7-ADCA. Great Britain 1,174,335 in Example 3 describes the application of this "sulfoxide rearrangement" to an ester of ampicillin sulfoxide in which the α-amino group is also blocked, that is, 6-[N-(2,2,2 - trichloroethylcarbonyl - D - α - amino - α-phenylacetamido]penicillanic acid sulfoxide 2,2,2 - trichloroethyl ester, by heating and then use of zinc and acetic acid to remove the two blocking groups and thus produce cephalexin.

The art contains numerous additional descriptions of penicillin sulfoxides and their preparation, as described for example, by Chow et al., J. Org. Chem. 27, 1381 (1962), by Guddal et al., Tetrahedron Letters No. 9, 381 (1962), by Essery et al., J. Org. Chem., 30, 4388 (1965) who included ampicillin sulfoxide, and in U.S. Pats. 3,197,466 and 3,544,581.

The reaction product of acetone with cephaloglycin, but not with cephalexin, is described in U.S. Pat. 3,303,-193. The reaction with acetone of certain ring-substituted cephalexins is described in general terms in U.S. Pats. 3,489,750, 3,489,751 and 3,489,752. 7-α-aminothienyl-acetamidocephalosporanic acids are described in U.S. Pats. 3,560,489 and 3,352,858 and are converted to corresponding compounds having a 3-methyl group ("cephalexin type") by the usual hydrogenation as first described in this field, for example, in U.S. Pat. 3,124,576 and see Great Britain 1,174,335 (and see also Canada 830,995).

The nucleophiles used to replace the bromine atom of the 3-bromomethyl substituent in the process of the present invention include acetate and the thiols described as displacing acetoxy in U.S. Pat. 3,516,997 and the nucleophiles defined and described in Great Britain 1,241,657.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,-806 and 1,123,333, in Belgian Pat. 696,026 (Farmdoc No. 29,494), in U.S. Pats. 3,311,621, 3,352,858, 3,489,-750, 3,489,751, 3,489,752 and 3,518,260, in Japanese Pat. 16871/66 (Farmdoc 23,231), by Spencer et al., J. Med. Chem., 9 (5), 746–750 (1966) and by Kurita et al., J. Antibiotics (Tokyo) (A) 19, 243–249 (1966) and see also U.S. Pat. 3,485,819.

Netherlands Pats. 68/11676 (Farmdoc 36,349) and 68/12382 (Farmdoc 36,496) and U.S. Pats. 3,489,750 and 3,489,751 disclose ring-substituted cephaloglycins.

Various 7 - [α - amino - arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyl-oxy as illustrated by U.S. Pat. 3,364,212, Belgian Pat. 675,298 (Farmdoc 22,206), South African Pat. 67/1260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

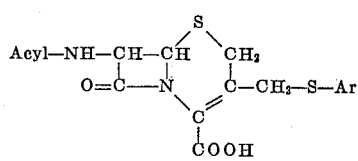

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for $R_3$. Additional nucleophiles of this type were disclosed by Fujisawa in Belgium 714,518 (Farmdoc 35,307; Netherlands 68/06129 and South Africa 2695/68), in Canada 818,501 (Farmdoc 38,845), in Great Britain 1,187,323 (Farmdoc 31,936; Netherlands 67/14888) and especially in U.S. 3,516,997 (Farmdoc 34,328; Netherlands 68/05179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md. at pages 236–243 and in J. Antibiotics (Japan) 23(3), 131–148 (1970).

Various cephalosporins having the structure

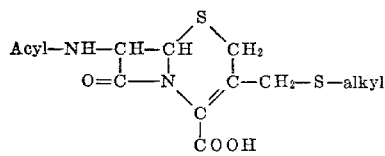

in which acyl represents various sidechains including α-aminophenylacetyl have been described in some of the above and by Glaxo in Belgium 734,532 (Farmdoc 41,619) and in Belgium 734,533 (Farmdoc 41,620).

Cephalosporins having the structure

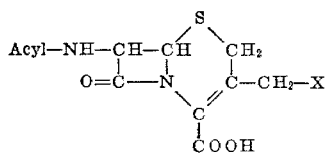

where X includes

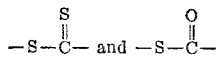

are disclosed in some of the above and in U.S. 3,239,515, 3,239,516, 3,243,435, 3,258,461, 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

One of the most extensive series of chemical publications in the cephalosporin field has come from scientists of Eli Lilly and Company; each paper gives a citation of the previous paper. The latest in series appears to be XXI appearing in J. Org. Chem. 36(9), 1259–1267 (1971).

Various procedures for reducing cephalosporin sulfoxides and converting esters to free acids are disclosed in South Africa 69/4766 (Eli Lilly).

The preparation of 2-(2-methyl-3-butenyl)-3-bromomethyl-7-phenoxyacetamido-$\Delta^2$ - cephem-4-carboxylate is described in Example 3 of South Africa 69/8494 (Eli Lilly) and it is reacted with methyl mercaptan in Example 4 and that product is then isomerized to the $\Delta^3$ compounds (3-methylmercapto) in Example 5.

The preparation from 3-hydroxymethyl cephalosporins of various 3-halomethyl cephalosporins, e.g. diphenylmethyl 3-bromomethyl-7β-2'-thienylacetamido-ceph-3-em-4-carboxylate, is described in Great Britain 1,241,658 (Glaxo) and Great Britain 1,241,657 describes their reaction with nucleophiles. For the 7-substituent, meaning the carboxylic acid residue attached to the 7-amino group, Great Britain 1,241,658 describes in general terms a vast number of substituents including the following statement as to the eleventh and last such class:

"(xi) α-Substituted carboxylic acid acyl groups, where the α-substituent is an amino, substituted amino [e.g. acylamido or a group obtained by reacting the amino group and/or acylamido group(s) with an aldehyde or ketone e.g. acetone or methyl ethyl ketone], hydroxy, carboxy, esterified carboxy, cyano, halogeno, acyloxy (e.g. formyloxy or lower alkanoyloxy) or etherified hydroxy group. The carboxylic acid may be aliphatic, e.g. an α-substituted paraffinic acid, or araliphatic, e.g., an α-substituted phenylacetic acid. Acyl groups of this character include particularly the group ArCH(X)CO where Ar is a phenyl or substituted phenyl group and X is an amino- or substituted amino group." See also Great Britain 1,241,655 and 1,241,656.

Glaxo's South Africa 70/5851 (claiming priority from a series of applications of which the earliest is G.B. 42502/69 filed Aug. 26, 1969) is concerned with bromination of cephalosporins and subsequent reactions. Thus, a representative example discloses the preparation and bromination of 2,2,2-trichloroethyl 3-methyl-7-(2,2,2-trichloroethoxycarbonylamino)ceph-3-em-4 - carboxylate sulfoxide to give 2,2,2-trichloroethyl 3-bromomethyl-7-(2,2,2-trichloroethoxycarbonylamino)ceph-3-em - 4 - carboxylate sulfoxide which was subsequently reacted with methanethiol to produce the fully blocked 3-methylthiomethyl compound which was converted by treatment with zinc dust in formic acid to 7-(D-2-amino-2-phenylacetamido)-3-methyl-thiomethyl-ceph-3-em-4-carboxylic acid and reaction with sodium acetate.

Bromination is also described schematically in U.S. Pat. 3,544,581.

U.S. Pat. 3,637,678 issued Jan. 25, 1972 discloses 3-bromomethyl-$\Delta^2$-cephalosporin ester intermediates, and $\Delta^2$-3-functionalized cephalosporin esters prepared by (a) brominating the 3-methyl group of a $\Delta^2$-desacetoxycephalosporin ester, and then (b) reacting the resulting 3-bromomethyl-$\Delta^2$-cephalosporin ester with a nucleophilic reagent to displace the bromine with the nucleophile and to form 3-(functionalized-methyl)-$\Delta^2$-cephalosporin esters which are useful as intermediates in the production of cephalosporin antibiotics, e.g., from penicillin starting materials.

Certain 3-bromomethyl cephalosporins are disclosed in U.S. 3,647,788 issued Mar. 7, 1972, in U.S. 3,668,203 issued June 6, 1972 in U.S. 3,705,897 issued Dec. 12, 1972, in U.S. 3,708,480 issued Jan. 2, 1973, in Lilly's Belgium 748,055 (Farmdoc 71,847R) and in J. Med. Chem. 14(11), 1136–1138 (1971) and the earlier publications cited therein with reference to their compound 1.

SUMMARY OF THE INVENTION

The present invention includes, but is not limited to, the novel intermediates (I, II and III below) and the separate processes (A through D below) which may be summarized

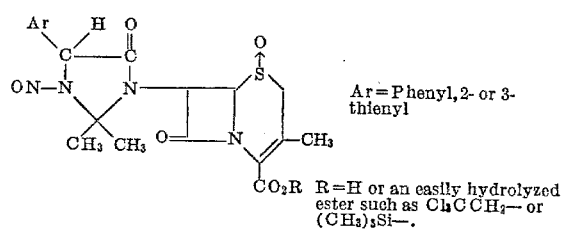

Ar = Phenyl, 2- or 3-thienyl $CO_2R$ R = H or an easily hydrolyzed ester such as $Cl_3CCH_2$— or $(CH_3)_3Si$—.

A brominating agent as illustrated by NBS ($CHCl_3$) hv

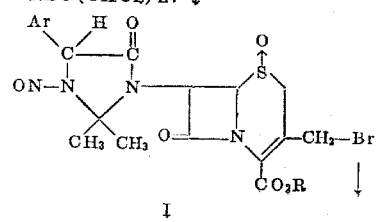

I

B.

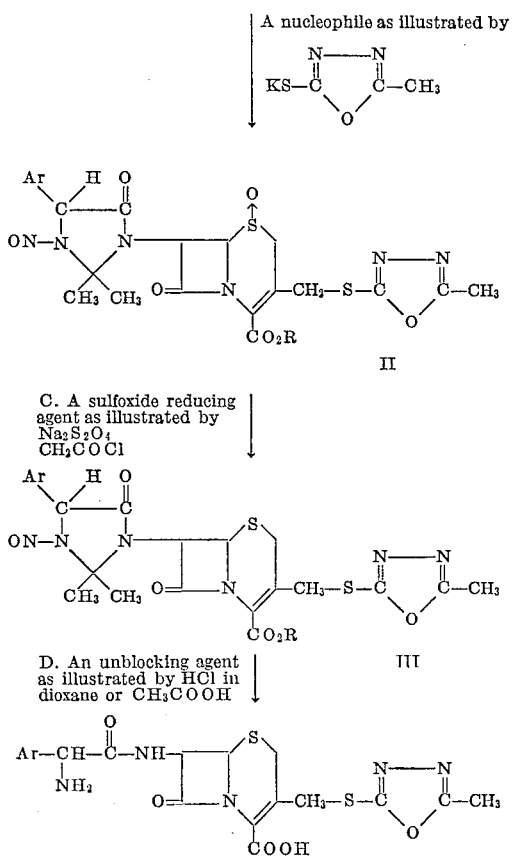

The bromination of Process A above may be effected by any convenient system capable of generating bromine atoms such as bromine itself, or a bromine transfer agent e.g. an N-bromoamido or an N-bromoimide. The N-amide or N-bromoimide may include a cyclic system, the amide or imide linkage forming part of the cyclic system; examples of such N-bromoamides include caprolactam and examples of such N-bromoimides include the 1,3-dibromo-5,5-diloweralkyl hydantoins e.g. 1,3-dibromo-5,5-dimethylhydantoin; 1,3-dibromo-5-ethyl-5-methylhydantoin; 1,3-dibromo-5-isopropyl-5-methylhydantoin, N-bromosuccinimide, N-bromophthalimide etc. Other useful N-bromoamides include N-bromo lower alkanoamides e.g. N-bromoacetamide. Another useful brominating agent is 1,3,5-tribromo-1,2,4-triazole. By reason of their availability, particularly preferred brominating agents include N-bromosuccinimide and 5,5-dimethyl-1,3-dibromohydantoin.

The various brominating agents require initiation in order to generate bromine atoms and suitable initiating systems include free-radical initiators such as azo compounds e.g. azobisisobutyronitrile, peroxides e.g. benzoyl peroxide, irradiation by ultra violet or visible light sources e.g. mercury arcs or tungsten lamps, or by γ-rays emitted by $Co^{60}$ sources.

The brominating agent may be added as such or in suspension or solution in a suitable solvent i.e. a solvent which solubilizes the starting material and which is substantially inert under the conditions or the reaction e.g. a hydrocarbon such as benzene or a halogenated hydrocarbon particularly a chlorinated hydrocarbon e.g. chloroform, methylene chloride, 1,2-dichloroethane etc. The brominating agent is added to a solution or suspension of the cephalosporin compound in a suitable solvent e.g. a halogenated hydrocarbon such as methylene chloride, chloroform, 1,2-dichloroethane or chlorobenzene or a hydrocarbon such as benzene. The bromination may be effected at temperatures ranging from —80° to +150° C. e.g. from —20° to +150° C., preferably from —40° to +85° C. The course of the bromination may be followed by measurement of the consumption of brominating agent and by thin-layer chromatography. The course of the reaction may also be followed by monitoring the ultra violet absorption spectrum or optical rotation.

The bromination is preferably carried out using N-bromosuccinimide or a dibromohydantoin as the brominating agent initiated by ultra violet irradiation at a low temperature e.g. from —20° to +10° C.

The addition of small amounts e.g. up to 5% by volume of water or an aqueous solution or suspension of a weak base such as an alkali metal or alkaline earth metal salt of a weak acid e.g. sodium bicarbonate, sodium carbonate, sodium acetate or calcium carbonate has been found to assist the bromination reaction. In this way the times of initiation and reaction may be reduced and/or the yield of 3-bromomethyl compound may be increased. The aqueous solution or suspension of the weak base is preferably at a pH of 7 to 11.

The bromination may be effected under an inert atmosphere.

After the introduction of the desired nucleophilic group the 1-sulphinyl group may be reduced by any convenient means. This may, for example, be effected by reduction of the corresponding acyloxysulphonium or alkyloxysulphonium salt prepared in situ by reaction with e.g. acetyl chloride in the case of an acetoxy-sulphonium salt, reduction being effected by, for example, sodium dithionite or by iodide ion as in a solution of potassium iodide in a water miscible solvent e.g. acetic acid, tetrahydrofuran, dioxane, dimethylformamide or dimethylacetamide. The reaction may be effected at a temperature of —20° to +50° C.

Alternatively, reduction of the 1-sulphinyl group may be effected by phosphorus trichloride or tribromide in solvents such as methylene chloride, dimethylformamide or tetrahydrofuran, preferably at a temperature of —20° to +50° C.

EXAMPLE 1

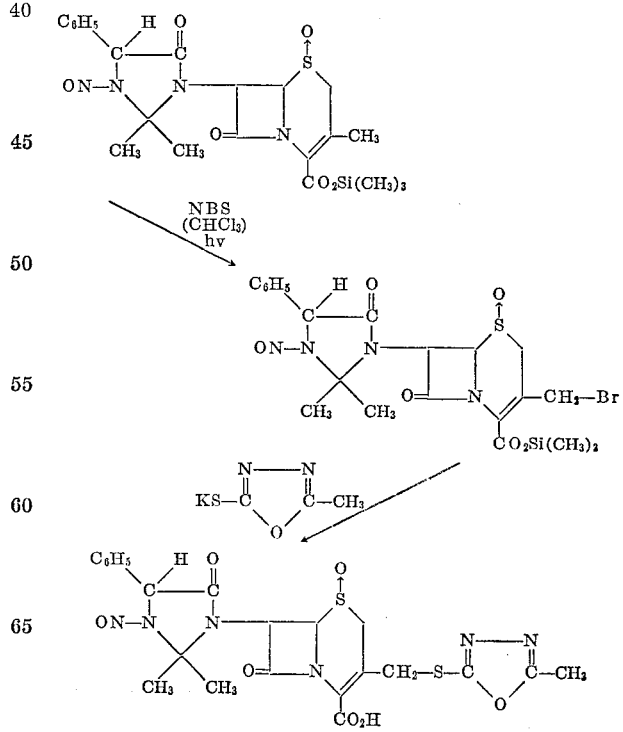

(a) 7-(D-2,2-dimethyl-3-nitroso - 5 - oxo-4-phenyl-1-imidazolidinyl) - 3 - (5 - methyl-1,3,4-oxadiazol-2-ylthiomethyl)-3-cephem-4-carboxylic acid 1-oxide To a solution of 1 g. (0.0023 mole) of 7-(D-2,2-dimethyl-3-nitroso-5-oxo - 4 - phenyl-1-imidazolidinyl)-3- methyl-3-cephem-4-carboxylic acid sulfoxide in 100 ml. of methylene chloride at 10° was added 230 mg. (0.0023 mole) of triethylamine and 250 mg. (0.0023 mole) of chlorotrimethylsilane. The reaction mixture was stirred at rt for 2 hours and cooled to 5° and 620 mg. (0.0035 mole) of N-bromosuccinimide with a catalytic amount of benzoyl peroxide was added. The solution was irradiated at 5° for 3 hours with a photoflood lamp and 370 mg. (0.0023 mole) potassium 5-methyl-1,3,4-oxadiazole-2-mercaptide was added all at once. The mixture was stirred overnight at rt. The methylene chloride was evaporated and the residue was dissolved in 50 ml. of ethyl acetate and extracted with 50 ml. of sodium bicarbonate solution. The aqueous extract was layered with ethyl acetate and acidified to pH 2 with 1:1 phosphoric acid. The organic layer was washed with water and evaporated to a gum which was dried by azeotropic distillation with ethyl acetate. The residue was triturated with ether to give 250 mg. of a light yellow solid. A bioautogram of this solid against a B. subtilis pH 6-seeded agar plate of a Brinkman silica gel plate in an acetone-methanol (1:1) system showed a biologically active sport corresponding exactly in $R_f$ value with that of authentic 7-(D-2,2-dimethyl-3-nitroso-5-oxo-4-phenyl-1-imidazolidinyl)-3-(5 - methyl-1,3,4-oxadiazol - 2 - yl-thiomethyl)-3-cephem-4-carboxylic acid sulfoxide.

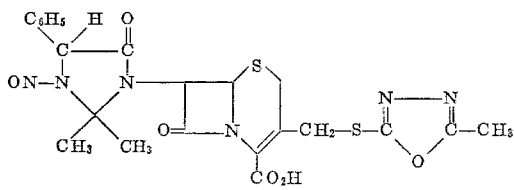

(b) 7-(D-2,2-dimethyl-3-nitroso - 5 - oxo-4-phenyl-1-imidazolidinyl)-3-(5-methyl - 1,3,4 - oxadiazol-2-ylthiomethyl)-3-cephem-4-carboxylic acid To a solution of 100 mg. (0.002 mole) of the above 7 - (D-2,2-dimethyl-3-nitroso-5-oxo-4-phenyl-1-imidazolidinyl) - 3 - (5 - methyl-1,3,4-oxidazol-2-ylthiomethyl)-3-cephem-4-carboxylic acid 1-oxide in 2 ml. of acetonitrile at 5° was added 100 mg. of sodium dithionite and 0.11 ml. of acetyl chloride. The mixture was stirred in the cold for 1 hour. Five ml. of water and 5 ml. of ethyl acetate were added and the mixture was adjusted to pH 6.5. The mixture was acidified to pH 2 with 1:1 phosphoric acid and ethyl acetate layer was washed with water and evaporated to a gum. It was dried by azeotropic distillation with ethyl acetate. The residue was solidified with dry ether and dried over $P_2O_5$ to yield 20 mg. A bioautogram of this solid against a B. subtilis pH 6-seeded agar plate of a Brinkman silica gel plate in a 1:1 acetone-methanol system shows a biologically active spot corresponding exactly with that of authentic 7-(D-2,2-dimethyl - 3-nitroso-5-oxo-4-phenyl-1-imidazolidinyl)-3-(5-methyl - 1,3,4-oxadiazol-2-ylthiomethyl)-3-cephem-4-carboxylic acid.

(c) 7 - (D-α-amino - α - phenylacetamido)-3-(5-methyl-1,3,4-oxadiazol-2-ylthiomethyl) - 3 - cephem-4-carboxylic acid To a solution of two grams of 7-(D-2,2-dimethyl-3-nitroso-5-oxo-4-phenyl - 1 - imidazolidinyl)-3-(5-methyl-1,3,4 - oxadiazol - 2 - ylthiomethyl)-3-cephem-4-carboxylic acid dissolved in 50 ml. of dioxane bubble in dry hydrogen chloride gas for 5 minutes. Stir the solution for 5 minutes and remove the solvent at 30° at 15 mm. Stir the residue with ethyl acetate and collect about 1.9 g. of crude 7-(D-α-amino-α-phenylacetamido) - 3 - (5-methyl-1,3,4 - oxadiazol-2-ylthiomethyl) - 3 - cephem-4-carboxylic acid. Dissolve this material in dilute hydrochloric acid at pH 2.5 and treat with charcoal ("Darko KB") for 5 minutes and then adjust the filtrate to pH 4 with 10% sodium hydroxide. Evaporate the water at 40° at 15 mm. to give about one gram of 7-(D-α-amino-α-phenylacetamido) - 3 - (5 - methyl-1,3,4-oxadiazol-2-ylthiomethyl)-3-cephem-4-carboxylic acid.

EXAMPLE 2

Trichloroethyl 7 - (D-2,2-dimethyl-3-nitroso - 5 - oxo-4-phenyl - 1 - imidazolidinyl)-3-methyl-3-cephem-4-carboxylate 1-oxide

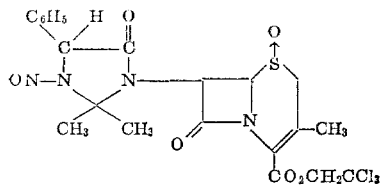

To a solution of 1 g. (0.0024 mole) of 7-(D-2,2-dimethyl - 3 - nitroso - 5 - oxo-4-phenyl-1-imidazolidinyl-3-methyl-3-cephem-4-carboxylic acid 1-oxide dissolved 50 ml. of tetrahydrofuran was added 186 mg. (0.0024 mole) of pyridine, 750 mg. (0.0051 mole) of trichloroethanol and 500 mg. (0.0024 mole) of dicyclohexylcarbodiimide. The reaction mixture was stirred for 24 hours, filtered to remove the dicyclohexylurea and the filtrate was evaporated to a light yellow solid. This material was chromatographed over silic acid 100–200 mesh using methylene chloride (10)-acetone (1) solvent system. The initial fraction (30 ml.) was evaporated and the ester weighed 675 mg.; M.P. 130° decomp.

Analysis.—Calcd. for $C_{21}H_{21}Cl_3N_4O_6S$ (percent): C, 44.73; H, 3.76; N, 9.94; Cl, 18.86. Found (percent): C, 44.99; H, 3.96; N, 9.93; Cl, 18.78.

NMR 100 mHz. (DMSO-$d_6$) 7.5–7.1 (m, 5 H's, $C_6\underline{H}_5$), 5.97 (d, J=4.5 Hz., 1 H, C-7-$\underline{H}$), 5.70 (S, 1 H, $C_6H_5C\underline{H}$), 5.16 and 4.99 (AB doublets, J=12 Hz., 2 H's, $CO_2C\underline{H}_2CCl_3$), 4.90 (d, J=4.5 Hz., $C_6H$), 4.12 and 3.68 (AB doublets, J=16 Hz., 2 H's, $C\underline{H}_2$), 2.14, 2.03 and 2.08 (3, s, 9 H's, $C(C\underline{H}_3)_2$, $C^3$-$C\underline{H}_3$).

IR (Nujol) 1800 cm.$^{-1}$ (β-lactam C=O), 1730 (ester C=O, imidazolidinyl C=O), 1065 (sulfoxide).

Trichloroethyl 7 - (D-2,2-dimethyl - 3 - nitroso-5-oxo-4-phenyl-1-imidazolidinyl) - 3 - bromomethyl-3-cephem-4-carboxylate 1-oxide

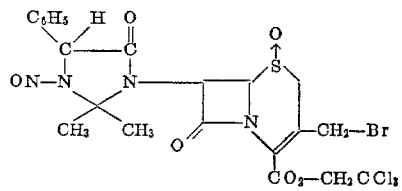

A 200 mg. (0.00356 mole) portion of the above ester was dissolved in 25 ml. of chloroform (treated with alumina to remove any methanol) and stirred at 20° with 71 mg. (0.004 mole) of N-bromo-succinimide and 2 mg. of benzoyl peroxide. The solution was illuminated for 4 hours under a photoflood lamp at 20°. The chloroform was removed by distillation and the residue was dissolved in ethyl acetate and washed with water. The organic phase was separated and evaporated to a gum which was dried by azeotropic distillation with ethyl acetate. The residue was dissolved in a minimal amount of ethyl acetate and diluted with "Skellysolve B" to yield 188 mg.; M.P. 124° decomp.

Analysis.—Calcd. for $C_{21}H_{20}BrCl_3N_4O_6S$ (percent): C, 39.29; H, 3.14; N, 8.73. Found (percent): C, 39.87; H, 3.99; N, 8.42. Halogen equivalents 3.45.

This product is used to replace the free acid in the procedure of Example 1(b) and 1(c) to produce 7-(D-α-amino-α-phenylacetamido)-3-(5 - methyl - 1,3,4 - oxadiazol-2-ylthiomethyl)-3-cephem-4-carboxylic acid.

EXAMPLE 3

(a) 7-(D-2,2-dimethyl - 3 - nitroso - 5 - oxo-4-phenyl-1-imidazolidinyl) - 3 - methyl - 3 - cephem-4-carboxylic acid (N-nitrosohetacephalexin) from cephalexin To a mixture of 10 g. (0.03 mole) of (7-D-α-aminophenylacetamido) - 3 - methyl - 3 - cephem-4-carboxylic acid (cephalexin) in 100 ml. of water was added 10% sodium hydroxide solution until a pH of 8.8 was attained. To this solution was added 40 ml. of acetone and the reaction was stored overnight. The solvent was evaporated leaving behind hetacephalexin as a frothy amorphous solid which was dissolved in 200 ml. of water and acidified to pH 2 with 6 N hydrochloric acid and layered with 200 ml. of ethyl acetate. The solution was cooled in an ice-bath to 5° and 1.6 g. (0.024 mole) of sodium nitrite was added. After stirring for ½ hour the ethyl acetate was separated, washed with water and evaporated under reduced pressure to an oil. The oil solidified on slurrying with ether to give 2.5 g. of N-nitrosohetacephalexin as an amorphous solid. During storage overnight a second crop separated which was crystalline and weighed 1.2 g. The crops were combined and recrystallized from ethyl acetate and ether. Yield 3.2 g. The analytical sample was recrystallized from boiling methanol, M.P. 158–160°.

*Analysis.*—Calcd. for $C_{19}H_{20}N_4O_5S$ ½ $H_2O$ (percent): C, 53.73; H, 4.74; N, 13.17. Found (percent): C, 53.90; H, 4.96; N, 13.48.

IR (KBr) 2500 to 3500 cm.$^{-1}$ (carboxyl-OH), 1780

1720 and 1730

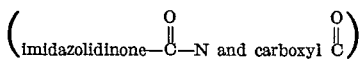

700 ($C_6H_5$—); nMr (DMSO $d_6$), 7.31 p.p.m. (S, 5, $C_6\underline{H}_5$—), 5.68

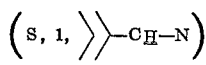

5.55 (d, 1, J=4.5 c.p.s., NC$\underline{H}$CO), 5.15 (d, 1, J=4.5 c.p.s., NC$\underline{H}$S), 2.9 to 3.6

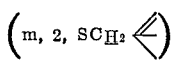

1.8 to 2.3

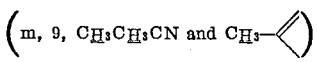

(b) 7-(D-2,2-dimethyl-3-nitroso-5-oxo-4-phenyl-1-imidazolinyl-3-methyl-3-cephem-4-carboxylic acid 1-oxide

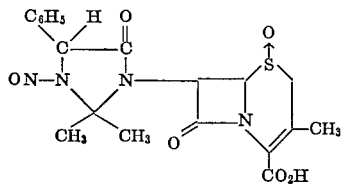

To a solution of 500 mg. (0.013 mole) of 7-(D-2,2-dimethyl - 3 - nitroso - 5 - oxo-4-phenyl-1-imidazolidinyl)-3-methyl-3-cephem-4-carboxylic acid in 20 ml. of water at pH 6 (adjusted by adding 1% NaOH solution) was added 300 mg. (0.014 mole) of sodium metaperiodate and the solution was stirred overnight. The mixture was filtered and the filtrate was acidified to pH 2 with a few drops of conc. hydrochloric acid. The solid was collected and recrystallized from acetone-water to yield 420 mg. (M.P. 188° decomp.) of crystalline 7-(D-2,2-dimethyl-3-nitroso - 5 - oxo - 4 - phenyl-1-imidazolidinyl)-3-methyl-3-cephem-4-carboxylic acid 1-oxide.

*Analysis.*—Calcd. for $C_{19}H_{20}N_4O_6S \cdot CH_3COCH_3$ (percent): C, 53.87; H, 5.34; N, 11.42. Found (percent): C, 53.61; H, 5.37; N, 11.42.

NMR (DMSO-d) (5 p.p.m. 5) 7.1–7.5 (m, 5. $C_6\underline{H}_5$), 5.9 (d, 1, $C_7\underline{H}$), 5.7 (S, 1, $C_6H_5C\underline{H}$), 4.8 (d, 1, $C_6\underline{H}$), 3.3–4.3 (AB, S-C$\underline{H}_2$-), 1.9–2.2 [m, 16, (C$\underline{H}_3$)$_2$-C-, $CH_3$-C=($CH_3$)$_2$C=0].

IR (Nujol) 3100–3600 cm.$^{-1}$ (carboxyl OH), 1810–1785 (β-lactam C=O), 1710–1730 (carboxyl C=O, imidazolidinyl C=O), 1695 (acetone C=O), 1030 (sulfoxide), 700 (phenyl).

(c) 7-(D-2,2-dimethyl-3-nitroso-5-oxo-4-phenyl-1-imidazolidinyl)-3-bromomethyl-3-cephem-4-carboxylic acid 1-oxide

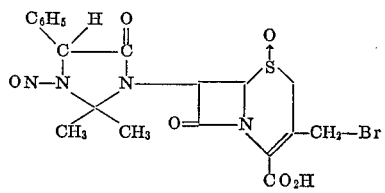

To a solution of 900 mg. (.0022 mole) of the sulfoxide in 50 ml. of methylene chloride was added 218 mg. (.0022 mole) of triethylamine and 236 mg. (.0022 mole) of trimethylsilyl chloride. The mixture was stirred for ½ hour and cooled to 10° in an ice-bath. A total of 388 mg. (.0022 mole) of N-bromosuccinimide was added and the mixture was irradiated with a photoflood lamp for 2 hours. The methylene chloride was evaporated and the residue was slurried with water and collected to yield 425 mg. of 7 - (D - 2,2 - dimethyl-3-nitroso-5-oxo-4-phenyl-1-imidazolidinyl) - 3 - bromomethyl - 3 - cephem-4-carboxylic acid 1-oxide; M.P. 110° decomp.

*Analysis.*—Calcd. for $C_{19}H_{19}BrN_4O_6S$ (percent): Br, 15.60. Found (percent): Br, 13.29.

IR (Nujol) 3100–3600 cm.$^{-1}$ (carboxyl OH), 1785 (β-lactam C=O), 1720 (carboxyl C=O, imidazolidinyl C=O), 1040 (sulfoxide).

This product is converted to 7-(D-2,2-dimethyl-3-nitroso - 5 - oxo - 4 - phenyl-1-imidazolidinyl)-3-(5-methyl-1,3,4-oxadiazol - 2 - ylthiomethyl)-3-cephem-4-carboxylic acid by silylation followed by reaction with potassium 5-methyl-1,3,4-oxadiazole-2-mercaptide according to the appropriate portions of Example 1(a).

EXAMPLE 4

7 - (D - 2,2 - dimethyl-5-oxo-4-phenyl-1-imidazolidinyl)- 3 - (5 - methyl - 1,3,4 - oxadiazolyl-2-thiomethyl)-3-cephem-4-carboxylic acid A solution of 200 mg. (0.005 mole) of 7-(D-2,2-dimethyl - 3 - nitroso - 5 - oxo-4-phenyl-1-imidazolidinyl)-3-(5-methyl - 1,3,4 - oxadiazolyl-2-thiomethyl)-3-cephem-4-carboxylic acid in 25 ml. of dioxane (peroxide free) was treated with dry hydrogen chloride at 5° for 20 minutes. The solvent was evaporated under reduced pressure (15 mm. 25°) and the residue was slurried with ethyl acetate and collected to yield 160 mg. 7-(D-2,2-dimethyl-5-oxo-4 - phenyl - 1 - imidazolidinyl) - 3 - (5-methyl-1,3,4-oxadiazolyl - 2 - thiomethyl)-3-cephem-4-carboxylic acid, M.P. 150°. The IR and NMR spectra were identical with the spectra of authentic material. A paper chromatogram of this material against a *B. subtilus* seeded agar plate developed in an n-butanol, ethanol, water system (4:1:5) showed a zone of inhibition corresponding exactly in R*f* with that of an authentic specimen.

ALTERNATE PREPARATION OF COMPOUNDS USED FOR COMPARISON (a) 7-amino-3-(5-methyl-1,3,4-oxadiazol-2-ylthiomethyl)-3-cephem-4-carboxylic acid Twenty-four grams (0.09 mole) of 7-ACA was dissolved in 450 ml. of 0.1 M phosphate buffer, pH 6.4 followed by 15 g. (0.18 mole) of sodium bicarbonate. Then 9.5 g.

(0.09 mole) of 2-mercapto-5-methyl-1,3,4-oxadiazole was added and, with moderate stirring, the solution was heated to 60°±0.5° C. At 60° C. the pH was checked and additional sodium bicarbonate was added to readjust the pH to 6.4. The solution was heated with stirring at 60°±0.5° C. for four hours. Then 18 g. of "Darko KB" was added and stirring was continued for 15 minutes. The solution was then filtered hot and a clear solution was obtained. The pH was adjusted to 4.5 by addition of 3 N HCl. After cooling at 0° C. in an ice bath for one hour the product was filtered off and washed with cold water. After air drying 5.1 g. was obtained, M.P. 240° C. (dec.).

Analysis.—Calcd. for $C_{11}H_{12}N_4O_4S_2$ (percent): C, 40.23; H, 3.70; N, 17.06. Found (percent): C, 39.60; H, 4.18; N, 15.85. Corrected for 0.7% $H_2O$.

The IR and NMR were consistent for the desired product.

(b) 7-(D-α-amino-α-phenylacetamido) - 3 - (5-methyl-1,3,4 - oxadiazol - 2 - ylthiomethyl) - 3 - cephem - 4-carboxylic acid To a stirred suspension of 6.25 g. (0.023 mole) of Sodium D-α-[1-carbomethoxypropen - 2 - yl) - amino]-phenylacetate in 70 ml. of acetonitrile and 2 drops of N,N-dimethylbenzylamine at —10° C. was added 3 g. (0.027 mole) of ethyl chloroformate and stirring continued for 15 minutes at —10° C. Next, a solution of 7.54 g. (0.023 mole) of 7-amino-3-(5-methyl-1,3,4-oxadiazol-2-ylthiomethyl)-3-cephem-4-carboxylic acid in 30 ml. of acetonitrile, 30 ml. $H_2O$ and 3.4 ml. (0.024 mole) of triethylamine was precooled to 0° C. and added all at once and stirring continued for 30 minutes at 0° C. Salt (NaCl) was added in excess to saturate the solution (15 minutes) and the organic layer was separated and to it added 25 ml. of $H_2O$. The resulting solution was concentrated in vacuo at 22° C. to a volume of about 35 ml. To this aqueous solution was added a solution of 9 ml. of 90% formic acid in 75 ml. of MIBK (methyl isobutyl ketone) and the mixture was stirred for 30 minutes. Four grams of solids were filtered off and air dried. This material was slurried in 35 ml. of $H_2O$ and 5 ml. of 40% $H_3PO_4$ for 15 minutes, filtered and the filtrate stirred another 15 minutes with 2 g. of "Darko KB" carbon filtered again and finally the pH adjusted to 3.2 with $NaHCO_3$. A small amount of crystalline material was filtered off and discarded. The filtrate was concentrated slightly at reduced pressure (22° C.) and a gummy solid precipitated. The mixture was heated to 50° C. whereupon the material (solids) crystallized rapidly. After slowly cooling to room temperature there was obtained 1.24 g. of crystalline, white material, dec. pt. 165° C.

7-[D - (α-amino-α-phenylacetamido)]-3-(5-methyl-1,3,4 - oxadiazol-2-ylthiomethyl)-3-cephem-4-carboxylic acid (called New Compound) after solution in 5% $NaHCO_3$ followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with four old compounds are also given.

(c) 7-(D-2,2-dimethyl - 3 - nitroso - 5 - oxo-4-phenyl-1-imidazolidinyl)-3-(5-methyl-1,3,4-oxadiazol - 2 - ylthiomethyl)-3-cephem-4-carboxylic acid

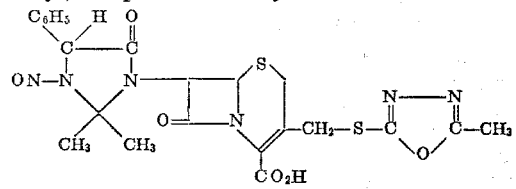

To a solution of 1.0 g. (0.0021 mole) of 7-(D-α-amino-α-phenylacetamido) - 3 - (5 - methyl - 1,3,4 - oxadiazol-2-ylthiomethyl)-3-cephem-4-carboxylic acid in 50 ml. of water adjusted to pH 9 by adding 10% NaOH dropwise with stirring was added 20 ml. of acetone. The solution was stored at 5° over the weekend. The acetone was evaporated off under reduced pressure (15 mm.) and 200 mg. (0.024 mole) of sodium nitrite was added. The solution was cooled in an ice-bath at 10° and 25 ml. of ethyl acetate was added. After acidification with 1:1 phosphoric acid to pH 2 the ethyl acetate layer was separated, washed with water and azeotroped to 7-(D-2,2-dimethyl-3-nitroso-5-oxo-4-phenyl - 1 - imidazolidinyl)-3-(5-methyl-1,3,4 - oxadiazol - 2 - ylthiomethyl) - 3 - cephem - 4-carboxylic acid as a yellow solid which crystallized after slurrying with ether. Yield 471 mg.; M.P. 211° decomp.

Analysis.—Calc. for $C_{22}H_{22}N_6O_6S$ (percent): C, 49.81; H, 4.18; N, 15.84. Found (percent): C, 50.31; H, 4.40; N, 15.64.

IR (Nujol) 3100–3600 cm.$^{-1}$ (carboxyl OH), 1810 (β-lactam C=O), 1740 (carboxyl C=O), 1715 (imidazolidinyl C=O), 700 (phenyl).

(d) 7-(D-2,2-dimethyl-3 - nitroso - 5 - oxo-4-phenyl-1-imidazolidinyl)-3-(5-methyl - 1,3,4 - oxadiazol-2-ylthiomethyl)-3-cephem-4-carboxylic acid 1-oxide

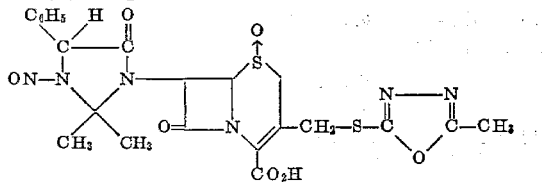

To a slurry of 4.5 g. (.0085 mole) of the above 7-(D-2,2 - dimethyl-3-nitroso-5-oxo-4-phenyl-1-imidazolidinyl)-3-(5-methyl - 1,3,4 - oxadiazol - 2 - ylthiomethyl) - 3-cephem-4-carboxylic acid in 200 ml. of water was added 1.95 g. (.0093 mole) of sodium metaperiodate. The solution was kept at pH 4.5 by the dropwise addition of 10% NaOH for 4 hours. The mixture was filtered and the filtrate was acidified with 1:1 phosphoric acid to pH 2. The crystalline solid was collected, washed well with water and air dried to yield 3 g.; M.P. 207° decomp. The analytical sample was washed with methanol and dried in vacuo over $P_2O_5$ for 24 hours.

Analysis.—Calcd. for $C_{22}H_{22}N_6O_7S_2$ (percent): C, 48.34; H, 4.06; N, 15.38. Found (percent): C, 48.76; H, 4.19; N, 15.25.

TABLE 1

[MIC in mcg./ml.]

| Organism | | New compound | Cephalexin | Cephaloglycin | Cephalothin | Cephaloridine |
|---|---|---|---|---|---|---|
| D. pneumoniae plus 5% serum [1] | A9585 | 0.13 | 1.3 | 0.3 | 0.08 | 0.008 |
| Str. pyogenes plus 5% serum [1] | A9604 | 0.25 | 0.3 | 0.16 | 0.08 | 0.008 |
| S. aureus Smith | A9537 | 1.3 | 1.3 | 1.3 | 0.08 | 0.03 |
| S. aureus Smith plus 50% serum | A9537 | >5 | 2.5 | 2.5 | 0.3 | 0.03 |
| S. aureus BX1633-2 at 10$^{-3}$ dil'n | A9606 | 2.5 | 4 | 0.6 | 0.3 | 0.3 |
| S. aureus meth., resistant | A15097 | 5 | 32 | 2 | 1.3 | 0.6 |
| Sal. enteritidis | A9531 | 0.6 | 4 | 0.3 | 0.3 | 0.6 |
| F. coli Juhl | A15119 | 4 | 8 | 1 | 4 | 1 |
| F. coli | A9675 | 8 | 16 | 4 | 16 | 1 |
| K. pneumoniae | A9977 | 1 | 4 | 0.6 | 1 | 1.3 |
| Do | A15130 | 8 | 8 | 1 | 8 | 2 |
| Pr. mirabilis | A9900 | 2 | 4 | 0.6 | 1 | 2.5 |
| Pr. morganii | A15153 | 16 | >125 | 16 | >250 | 250 |
| P. aeruginosa | A9843A | >250 | >125 | 250 | >250 | >250 |
| Ser. marcescens | A20019 | >250 | >125 | 250 | 250 | 250 |

[1] 50% nutrient broth plus 45% antibiotic assay broth.

IR (Kbr) 2400–3400 cm.$^{-1}$ (carboxyl OH), 1810 ($\beta$-lactam C=O), 1730 (carboxyl C=O, imidazolidinyl C=O), 1025 (sulfoxide), 705 (phenyl).

We claim:

1. A compound having the formula

[structure]

wherein Ar is phenyl, 2-thienyl or 3-thienyl.

2. A compound having the formula

[structure]

wherein Ar is phenyl, 2-thienyl or 3-thienyl.

3. A compound having the formula

[structure]

wherein Ar is phenyl, 2-thienyl or 3-thienyl and R is a silyl group.

4. A compound having the formula

[structure]

wherein Ar is phenyl, 2-thienyl or 3-thienyl.

5. The compound of the formula

[structure]

6. The compound of claim 5 having the D configuration at the carbon atom adjacent to the benzene ring.

7. The compound of the formula

[structure]

8. The compound of claim 7 having the D configuration at the carbon atom adjacent to the benzene ring.

9. The compound of the formula

[structure]

wherein R is a silyl group.

10. The compound of claim 9 having the formula

[structure]

11. The compound of claim 10 having the D configuration at the carbon atom adjacent to the benzene ring.

References Cited

UNITED STATES PATENTS

| | | | |
|---|---|---|---|
| 3,634,418 | 1/1972 | Willner | 260—243 C |
| 3,647,786 | 3/1972 | Cooper | 260—243 C |
| 3,655,658 | 4/1972 | Godtfredsen et al. | 260—243 C |

NICHOLAS S. RIZZO, Primary Examiner

U.S. Cl. X.R.

424—246